United States Patent Office 3,651,116
Patented Mar. 21, 1972

3,651,116
SILYLATED PROSTAGLANDIN $F_a$ ACIDS
AND ESTERS
Frank H. Lincoln, Jr., Portage, and John E. Pike, Kalamazoo, Mich., assignors to The Upjohn Company, Kalamazoo, Mich.
No Drawing. Continuation-in-part of application Ser. No. 873,603, Nov. 3, 1969. This application Aug. 4, 1970, Ser. No. 60,928
Int. Cl. C07f 7/04, 7/18
U.S. Cl. 260—448.8 R
22 Claims

ABSTRACT OF THE DISCLOSURE

Prostaglandin $F_a$ acids and esters are obtained in improved yields with respect to the usual byproduct prostaglandin $F_\beta$ acids and esters by silylating corresponding prostaglandin E compounds, reducing the silylated prostaglandin E compounds to silylated prostaglandin F compounds, and then removing the silyl groups by hydrolysis.

CROSS REFERENCE TO RELATED APPLICATION

This application is a continuation-in-part of our copending application Ser. No. 873,603, filed Nov. 3, 1969, now abandoned.

DESCRIPTION OF THE INVENTION

This invention relates to novel processes for producing organic chemical compounds and to novel intermediates useful in those processes. In particular, this invention relates to novel processes for producing optically active compounds of the formula:

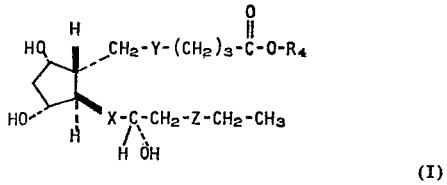

(I)

or racemic compounds of that formula and the mirror image thereof, wherein X is —$CH_2CH_2$— or trans-CH=CH—, and both Y and Z are —$CH_2CH_2$—, or wherein X is trans—CH=CH—, Y is a cis-CH=CH—, and Z is —$CH_2CH_2$— or cis-CH=CH—, and wherein $R_4$ is hydrogen or alkyl or one to 4 carbon atoms, inclusive, i.e., methyl, ethyl, propyl, isopropyl, butyl, isobutyl, sec-butyl, and tert-butyl.

In Formula I, broken line attachments to the cyclopentane ring indicate substituents in alpha configuration, i.e., below the plane of the cyclopentane ring. Heavy solid line attachments to the cyclopentane ring indicate substituents in beta configuration, i.e., above the plane of the cyclopentane ring. The side-chain hydroxy is in S configuration.

When $R_4$ in Formula I is hydrogen, that formula defines four known optically active prostaglandins F (PGF). when X, Y, and Z are —$CH_2CH_2$—, the compound defined is known as dihydro-$PGF_{1a}$. When X is trans-CH=CH—, and Y and Z are —$CH_2CH_2$—, the compound defined is known as $PGF_{1a}$. When X is trans-CH=CH—, and Y and Z are —$CH_2CH_2$—, the compound defined is known as $PGF_{1a}$. When X is trans-CH=CH—, Y is cis-CH=CH—, and Z is —$CH_2CH_2$—, the compound defined is known as $PGF_{2a}$. When X is trans-CH=CH—, and Y and Z are cis-CH=CH—, the compound defined is known as $PGF_{3a}$.

It will be observed that molecules of these four prostaglandins F each contain several centers of asymmetry. As drawn and where $R_4$ is hydrogen, Formula I represents the particular optically active form of the prostaglandin F compounds obtained from certain mammalian tissues, for example, sheep vesicular glands, swine lung, or human seminal plasma, or by carbonyl and/or double bond reduction of a prostaglandin so obtained. See, for example, Bergstrom et al., Pharmacol. Rev. 20, 1 (1968), and references cited therein. The mirror image of Formula I would represent the enantiomers of the same four prostaglandins F. The racemic forms of these four prostaglandins F would each contain equal numbers of both enantiomeric molecules, and Formula I and the mirror image of that formula would both be needed to represent correctly those racemic compounds. For convenience hereinafter, use of the terms dihydro-$PGF_{1a}$, $PGF_{1a}$, $PGF_{2a}$, and $PGF_{3a}$ will mean the optically active form of that prostaglandin F with the same absolute configuration as $PGF_{1a}$ obtained from mammalian tissues. When reference to the racemic form of one of the prostaglandins. F is intended, the word "racemic" will preceed the prostaglandin name, thus racemic dihydro-$PGF_{1a}$, racemic $PGF_{1a}$, racemic $PGF_{2a}$, and racemic $PGF_{3a}$.

When $R_4$ in Formula I or in the combination of Formula I and the mirror image thereof is alkyl of one to 4 carbon atoms, inclusive, there are described the alkyl esters of the four optically active prostalandins F and the four racemic prostaglandins F. Examples of alkyl of one of 4 carbon atoms, inclusive, are methyl, ethyl, propyl, isopropyl, butyl, isobutyl, sec-butyl, and tert-butyl.

As mentioned above, optically active dihydro-$PGF_{1a}$, $PGF_{1a}$, $PGF_{2a}$, and $PGF_{3a}$ with the absolute configuration shown in Formula I are known in the art. The racemic forms of $PGF_{1a}$ and $PGF_{2a}$ are also known. See, for example, Just et al., J. Am. Chem. Soc. 91, 5364 (1969), Corey et al., J. Am. Chem. Soc. 90, 3245 (1968), and Schneider, Chemical Communications (Great Britain), 304 (1969). The racemic form of dihydro-$PGF_{1a}$ is readily available by catalytic hydrogenation of racemic $PGF_{1a}$ or racemic $PGF_{2a}$, for example, in the presence of a 5% palladium-on-charcoal catalyst in ethyl acetate solution at 25° C. and one atmosphere pressure of hydrogen. The racemic form of $PGF_3$ is readily available by sodium borohydride reduction of racemic $PGE_3$ methyl ester or by the novel process of this invention followed by saponification. Racemic $PGE_3$ methyl ester is known in the art. See Axen et al., Chemical Communications 602 (1970).

The alkyl esters of these optically active and racemic prostaglandins F are also known, or are prepared by methods known in the art, for example, by reaction of the corresponding Formula I prostaglandin F acid ($R_4$ is hydrogen) with the appropriate diazohydrocarbon, or by reaction of the silver salt of said acid with the appropriate alkyl iodide.

The various optically active and racemic prostaglandins F and the alkyl esters thereof encompassed by Formula I and by the combination of that formula and the mirror image thereof of are useful for various pharmacological purposes. With particular regard to $PGF_{2a}$, see, for example, Bergstrom et al., cited above, and references cited therein, Wiqvist et al., The Lancet, 889 (1970), and Karim et al., J. Obstet. Gynaec. Brit. Cwlth., 76, 769

(1969). The other optically active and racemic prostaglandins F mentioned above, and also the various alky esters mentioned above, are useful for the same purposes. See, for example, Ramwell et al., Nature, 221, 1251 (1969).

It is known to prepare optically active and racemic prostaglandins F and alkyl esters thereof encompassed by Formula I and by the combination of that formula and the mirror image thereof by carbonyl reduction of the corresponding optically active or racemic prostaglandin E compounds. The latter have the formula:

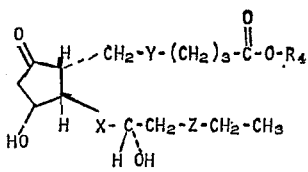

(II)

or the combination of that formula and the mirror image thereof, wherein X, Y, Z, and R₄ are as defined above for Formula I. These optically active and racemic reactants are known in the art or can be prepared by methods known to the art. It will be observed that Formula II differs from Formula I in that Formula II has a ring carbonyl (at the 9-position) rather than the ring alpha-hydroxy of Formula I.

For this reduction, use is made of any of the known ketonic carbonyl reducing agents which do not reduce ester or acid groups or carbon-carbon double bonds when the latter is undesirable. Examples of those are the metal borohydrides, especially sodium, potassium, and zinc borohydrides, lithium (tri-tert-butoxy) aluminum hydride, metal trialkoxy borohydrides, e.g., sodium trimethoxyborohydride, lithium borohydride, diisobutyl aluminum hydride, and when carbon-carbon double bond, especially cis, reduction is not a problem, the boranes, e.g., disiamylborane.

One series problem with this known method for producing the Formula I prostaglandin $F_\alpha$ compounds ($\alpha$-hydroxy at the 9-position) is that large amounts of the corresponding isomeric prostaglandin $F_\beta$ compounds $\beta$-hydroxy at the 9-position) are simultaneously produced, and usually the $F_\beta$ isomer is the predominate product. For example, 35 parts of $PGF_{1\alpha}$ and 65 parts of $PGF_{1\beta}$ are produced by sodium borohydride reduction of optically active $PGE_1$ of the natural configuration. Similarly, 42 parts of $PGF_{2\alpha}$ and 58 parts of $PGF_{2\beta}$ are produced by sodium borohydride reduction of optically active $PGE_2$ of the natural configuration. Similarly, sodium borohydride reduction of racemic $PGE_2$ gives 45 parts of racemic $PGF_{2\alpha}$ and 55 parts of $PGF_{2\beta}$. See Schneider, cited above. These $PGF_\beta$ byproducts have pharmacological spectra different than those of the corresponding Formula I $PGF_\alpha$ compounds. Therefore, the mixture of alpha and beta isomers is not always useful in place of the pure alpha compound, and the two isomers must be separated for many of the intended uses of the $PGF_\alpha$ compound. This separation is readily accomplished, but when the $PGF_\alpha$ compound is desired, the $PGF_\beta$ compound is considered an undesirable and wasteful byproduct. A small increase in the ratio of $PGF_\alpha$ compound to $PGF_\beta$ compound is usually observed when a PGE lower alkyl ester, e.g., $PGE_2$ methyl ester, is the reduction reactant rather than the PGE acid. The PGF ester is then saponified to the PGF acid if the latter is preferred. However, the large proportions of $PGF_\beta$ esters produced still represents serious procedural and economic problems when the $PGF_\alpha$ compound, acid or ester, is desired.

We have now discovered certain novel, highly useful, and economically advantageous processes for preparing the Formula I $PGF_\alpha$ compounds from the corresponding PGE compounds. These processes comprise the steps, (1) reducing the ring carbonyl of a compound of the formula:

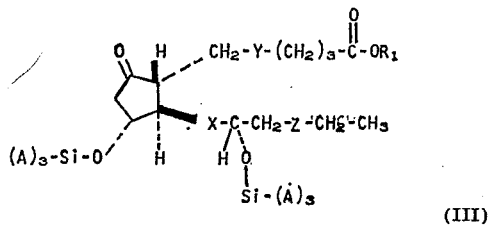

(III)

Wherein X, Y, and Z are as defined above for Formula I, A is alkyl of one to 4 carbon atoms, inclusive, phenyl, phenyl substituted with one or 2 fluoro, chloro, or alkyl of one to 4 carbon atoms, inclusive, or aralkyl of 7 to 12 carbon atoms, inclusive, and wherein $R_1$ is hydrogen or —Si—(A)₃ when R₄ in the Formula I product is to be hydrogen, or alkyl of one to 4 carbon atoms, inclusive, when R₄ is to be that alkyl, (2) hydrolyzing the resulting reduction product, and (3) separating the 9α-hydroxy acid or ester from the hydrolysis reaction mixture. The optically active and racemic reactants of Formula III are prepared by silylation of the corresponding prostaglandins E of Formula II.

The intermediate reduction product resulting from step (1) of the above process has the generic formula:

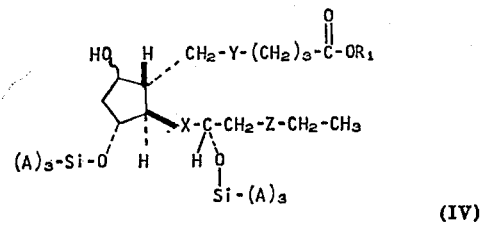

(IV)

wherein X, Y, Z, A and $R_1$ are as defined above, and ~ indicates attachment of HO— to the ring in alpha or beta configuration. This product is usually a mixture of these alpha and beta isomers, the alpha isomer being the major constituent of each mixture. In some instances, however, the intermediate of Formula IV is entirely the alpha isomer.

For convenience hereinafter, processes according to this invention for producing Formula I acid and for producing Formula I alkyl esters will be described separately.

Chart A describes the novel processes of this invention to produce Formula I compounds wherein R₄ is hydrogen, i.e., the $PGF_\alpha$ acids. Chart B describes the novel processes of this invention to produce Formula I compounds wherein R₄ is alkyl of one to 4 carbon atoms, inclusive, i.e., the $PGF_\alpha$ alkyl esters.

In Charts A and B, X, Y, Z and A are as defined above.

CHART A

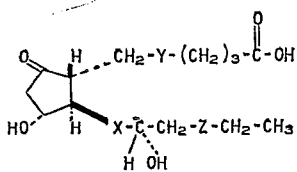

V

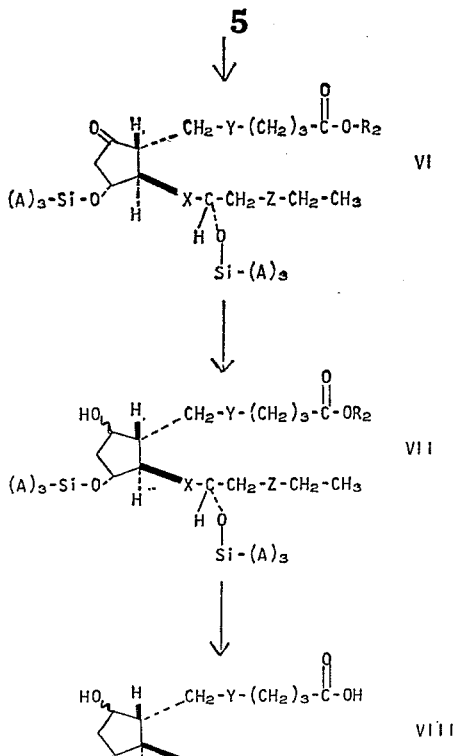

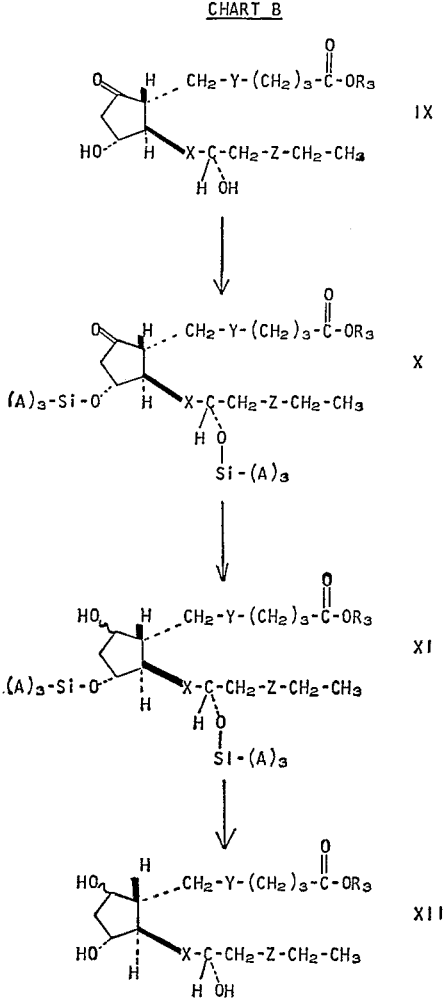

CHART B

The various A of a —Si—(A)₃ moiety are alike or different. For example, an —Si—(A)₃ can be trimethylsilyl, dimethylphenylsilyl, or methylphenylbenzylsilyl.

In Chart A, $R_2$ is hydrogen or —Si—(A)₃ wherein A is as defined above. In Chart B, $R_3$ is alkyl of one to 4 carbon atoms, inclusive.

Referring now to Charts A and B, the PGE acid of Formula V and the PGE ester of Formula IX are transformed to silyl derivatives of Formulas VI and X, respectively, by procedures known in the art. See, for example, Pierce, "Silylation of Organic Compounds," Pierce Chemical Co., Rockford, Ill. (1968). Both hydroxy groups of the Formula V or IX PGE reactant are thereby transformed to —O—Si—(A)₃ moieties, and sufficient silylating agent is used according to known procedures to accomplish that. The necessary silylating agents for this purpose are known in the art or are preparel by methods known in the art. See, for example, Post, "Silicones and Other Organic Silicon Compounds," Reinhold Publishing Corp., New York, N.Y. (1949). In the case of the Formula V PGE acid reactant, excess silylating agent and prolonged treatment also transform the —COOH to —COO—Si—(A)₃. It is optional in the novel processes of this invention whether or not the —COOH of the Formula V PGE acid reactant is esterified to —COO—Si—(A)₃.

Referring again to Charts A and B, the disilylated or trisilylated Formula VI PGE intermediates and the disilylated Formula X PGE intermediates are reduced to the corresponding silylated Formula VII and Formula XI PGF intermediates are reduced to the corresponding silylated Formula VII and Formula XI PGF intermediates, respectively. These ring carbonyl reductions are carried out by methods known in the art for ring carbonyl reductions of known PGE-type compounds. See, for example, Bergstrom et al., Arkiv Kemi, 19, 563 (1963), and Acta Chem. Scand. 16, 969 (1962), and British specification No. 1,097,533. Useful reducing agents are those mentioned above as being used for this general purpose when reducing $PGE_1$ and $PGE_2$, for example, directly to corresponding $PGF_\alpha$ and $PGF_\beta$ mixtures. The metal borohydrides, especially sodium, potassium, and zinc borohydrides, are preferred for this purpose.

Referring again to Charts A and B, the disilylated or trisilylated Formula VII PGF intermediates and the disilylated Formula XI PGF intermediates are hydrolyzed to the corresponding Formula VIII PGF acids and Formula XII PGF esters, respectively. The hydrolyses are carried out by prior art procedures known to be useful for transforming silyl ethers and silyl esters to alcohols and carboxylic acids, respectively. See, for example, Pierce, cited above, especially p. 447 thereof. A mixture of water and sufficient of a water-miscible organic diluent to give a homogeneous hydrolysis reaction mixture represents a catalytic reaction medium. Addition of a catalytic amount of an organic or inorganic acid hastens the hydrolysis. The length of time required for the hydrolysis is determined in part by the hydrolysis temperature. With a mixture of water and methanol at 25° C., several hours is usually sufficient for hydrolysis. At 0° C., several days is usually necessary.

Referring again to Charts A and B, the Formula VIII PGF acid products and the Formula XII PGF ester products are usually each mixtures of the two isomers, 9α and 9β, as shown by the wavy line ∼ connecting the 9-hydroxy group to the cyclopentane ring. As mentioned above, mixtures of $PGF_\alpha$ and $PGF_\beta$ acids or esters are also obtained by direct carbonyl reduction of the corresponding PGE acids or esters. Surprisingly and quite unexpectedly, the Formula VIII and Formula XII mixtures obtained by the processes of Charts A and B, respectively, contain substantially greater amounts of the desired alpha isomer and lesser of the less desired beta isomer than when the PGE acid or ester is reduced directly to a PGF acid or ester by prior art procedures. For this reason, the novel processes of this invention represent a substantial advance in this art.

When desired, the PGF$_\alpha$ acid or PGF$_\alpha$ ester is separated by known procedures from the PGF$_\beta$ acid or PGF$_\beta$ ester in the Formulas VIII and XII mixtures. Procedures useful for this separation are those used to separate known mixtures of PGF$_\alpha$ and PGF$_\beta$ acids or esters obtained by direct carbonyl reduction of the corresponding PGE acid or ester. See, for example, Schneider, cited above, Bergstrom et al., Arkiv Kemi, 19, 563 (1963) and Acta Chem. Scand. 16, 969 (1962), British specification No. 1,097,-533, Granstrom et al., J. Biol. Chem. 240, 457 (1965), and Green et al., J. Lipid Research 5, 117 (1964).

The invention can be more fully understood by the following examples.

EXAMPLE 1

PGF$_{2\alpha}$ methyl ester

A solution of PGE$_2$ (0.50 g.) in 10 ml. of dichloromethane is mixed with excess diazomethane in diethyl ether solution. After 10 minutes at 25° C., the reaction mixture is evaporated to dryness, and the methyl ester residue is dissolved in 25 ml. of anhydrous tetrahydrofuran. With protection from moisture, hexamethyldisilazane (5 ml.) and trimethylchlorosilane (1 ml.) are added, and the resulting cloudy white mixture is maintained at 25° C. for 16 hours. The mixture is then evaporated at 50° C. under reduced pressure to give a mixture of oil and solid residue. Benzene (25 ml.) is twice added to the mixture, and then is evaporated under reduced pressure. The residue is then dissolved in 135 ml. of methanol, and the solution is cooled to 0° C. With protection from moisture and with continued cooling at 0° C., a solution of sodium borohydride (0.50 g.) in 25 ml. of methanol at −5° C. is added during 2 minutes. The resulting mixture is stirred 10 minutes at 0° C. Then, 2 ml. of acetone is added, and the mixture is stirred an additional 10 minutes. Acetic acid (0.8 ml.) is added, and the mixture is evaporated under reduced pressure to 10 ml. volume. This mixture is then diluted with 25 ml. of saturated aqueous sodium chloride solution, and the diluted mixture is extracted three times with ethyl acetate. The combined ethyl acetate extracts are dried and evaporated. The residue is dissolved in 25 ml. of methanol, and the solution is diluted with 10 ml. of water. The mixture is maintained at 25° C. for 16 hours, and then is concentrated at reduced pressure to remove methanol. The resulting residue is extracted three times with ethyl acetate. The combined extracts are dried and evaporated, and the residue is chromatographed on 50 g. of silica gel (Merck Darmstadt), eluting successively with 250 ml. of 50% ethyl acetate in Skellysolve B (a mixture of isometric hexanes), 250 ml. of 75% ethyl acetate in Skellysolve B, 750 ml. of ethyl acetate, and 250 ml. of ethyl acetate containing 10% methanol. The ethyl acetate eluates are evaporated to give PGF$_{2\alpha}$ methyl ester (0.375 g.). The ethyl acetate-methanol eluates are evaporated to give a mixture of PGF$_{2\alpha}$ and PGF$_{2\beta}$ methyl esters containing 20% by weight of PGF$_{2\alpha}$ methyl ester.

EXAMPLE 2

PGF$_{2\alpha}$ methyl ester

A solution of PGF$_2$ (16.0 g.) in 150 ml. of dichloromethane is mixed with excess diazomethane in dethyl ether solution. After 10 minutes at 25° C., a few drops of acetic acid is added to the yellow solution to destroy the excess diazomethane. The resulting solution is evaporated under reduced pressure, and the methyl ester residue is dissolved in 300 ml. of anhydrous tetrahydrofuran. With protection from moisture, hexamethyldisilazane (50 ml.) and trimethylchlorosilane (10 ml.) are added, and the resulting mixture is stirred slowly at 25° C. for 20 hours. The cloudy white mixture is then evaporated to a syrup at 50° C. under reduced pressure. Anhydrous benzene (200 ml.) is twice added to the syrup, each time being evaporated under reduced pressure. The residue is then dissolved in 2500 ml. of methanol pre-cooled to 5° C. The resulting solution is cooled to 0° C. A solution of sodium borohydride (46 g.) in 2500 ml. of methanol cooled to −10° C. is then added with stirring in portions over 10 minutes at such a rate that the reaction mixture temperature rises to 10° C. The total mixture is then stirred an additional 10 minutes at 10° C. Then, 50 ml. of acetone is added, and the mixture is stirred an additional 10 minutes. Then, 75 ml. of acetic acid is added, and the mixture is concentrated under reduced pressure at 40° to 50° C. to a 1000-ml. volume. Water (200 ml.) is then added and the mixture is stirred 3 hours at 25° C. This mixture is concentrated under reduced pressure to remove methanol. The resulting residue is extracted four times with ethyl acetate. The combined extracts are washed with saturated aqueous sodium chloride solution, dried with anhydrous magnesium sulfate, and evaporated under reduced pressure. The residue is dissolved in a small amount of benzene, and the solution is chromatographed on 1 kg. of silica gel, wet packed with 50% ethyl acetate in Skellysolve B, eluting successively with (A) 5 l. of 50% ethyl acetate in Skellysolve B, (B) 5 l. of 75% ethyl acetate in Skellysolve B, (C) 2 l. of ethyl acetate, (D) 1 l. of ethyl acetate, (E) 1 l. of ethyl acetate, (F) 10 l. of ethyl acetate, (G) 1 l. of ethyl acetate, (H) 1 l. of 10% methanol in ethyl acetate, and (I) 4 l. of 10% methanol in ethyl acetate, collecting and evaporating each of the corresponding eluates under reduced pressure. The residue from eluate F is PGF$_{2\alpha}$ methyl ester (9.67 g.). The residue from eluate E and the combined resides from eluates D and G are separately chromatographed in the same manner, using proportionately smaller amounts of silica gel and solvents to give an additional total of 1.73 g. of PGF$_{2\alpha}$ methyl ester.

Following the procedures of Examples 1 and 2 but using dihydro-PGE$_1$ methyl ester, PGE$_1$ methyl ester, and PGE$_3$ methyl ester in place of the PGE$_2$ methyl ester, theer are obtained PGF methyl ester mixture containing major proportions of dihydro-PGF$_{1\alpha}$ methyl ester, PGF$_{1\alpha}$ methyl ester, and PGF$_{3\alpha}$ methyl ester, respectively. Those PGF$_\alpha$ esters are each separated from the reduction product mixture as described in Examples 1 and 2.

Also following the procedures of Examples 1 and 2 but using racemic dihydro-PGE$_1$ methyl ester, racemic PGE$_1$ methyl ester, racemic PGE$_2$ methyl ester, and racemic PGE$_3$ methyl ester in place of the PGE$_2$ methyl ester there are obtained racemic PGF methyl ester mixtures containing major proportions of racemic dihydro-PGF$_{1\alpha}$ methyl ester, racemic PGF$_{1\alpha}$ methyl ester, racemic PGF$_{2\alpha}$ methyl ester, and racemic PGF$_{3\alpha}$ methyl ester, respectively. Those PGF$_\alpha$ esters are each separated from the reduction product mixture as described in Examples 1 and 2.

Also following the procedures of Examples 1 and 2, the ethyl, propyl, isopropyl, butyl, isobutyl, sec-butyl, and tert-butyl ester of dihydro PGE$_1$, racemic dihydro-PGE$_1$, PGE$_1$, racemic PGE$_1$, PGE$_2$, racemic PGE$_2$, PGE$_3$ and racemic PGE$_3$ are each transformed to corresponding PGF ester mixtures containing major proportions of the PGF$_\alpha$ ester. Those PGF$_\alpha$ esters are each separated from the reduction product mixture as described in Examples 1 and 2.

Also following the procedures of Examples 1 and 2 but preparing di-triphenylsilyl esters and di-tribenzylsilyl esters of the methyl, ethyl, propyl, isopropyl, butyl, isobutyl, sec-butyl, and tert-butyl esters of dihydro-PGE$_1$, racemic dihydro-PGE$_1$, PGE$_1$, racemic PGE$_1$, PGE$_2$, racemic PGE$_2$, PGE$_3$, and racemic PGE$_3$, there are obtained PGF esters mixtures containing major portions of the PGF$_\alpha$ esters. Those PGF$_\alpha$ esters are each separated from the reduction product mixture as described in Examples 1 and 2.

Also following the procedures of Examples 1 and 2 but using potassium borohydride, zinc borohydride, lithium (tri-tert-butoxy) aluminum hydride, sodium trimethoxyborohydride, lithium borohydride, and diisobutyl aluminum hydride, each in place of the sodium borohydride of the examples, there are obtained $PGF_2$ methyl ester mixtures containing major proportions of $PGF_{2\alpha}$ methyl ester which is separated from the reduction product mixtures as described in Examples 1 and 2.

EXAMPLE 3

$PGF_{2\alpha}$

Hexamethyldisilazane (8 ml.) and trimethylchlorosilane (1.6 ml.) are added at 25° C. to a moisture-protected solution under nitrogen of $PGE_2$ (0.400 g.) in 40 ml. of tetrahydrofuran. The resulting cloudy suspension is stirred under nitrogen at 25° C. for 16 hours, and then is evaporated under reduced pressure. The residue is twice dissolved in toluene, the solution each time being evaporated under reduced pressure at 50° C. A solution of sodium borohydride (0.40 g.) in 20 ml. of methanol at 0° C. is then added in portions during one minute to a solution of the residue in 105 ml. of methanol protected from moisture and at 0° C. The resulting mixture is maintained at 0° C. for 20 minutes. Then, 2 ml. of acetone is added. Ten, 0.5 ml. of acetic acid is added, and the methanol is evaporated under reduced pressure. The residue is mixed with 5 ml. of water, and the mixture is acidified to pH 2 with 3 N hydrochloric acid, saturated with sodium chloride, and extracted four times with ethyl acetate. The combined extracts are washed with saturated aqueous sodium chloride solution, dried, and evaporated. The residue is dissolved in 10 ml. of methanol. The solution is diluted with 3 ml. of water, and the mixture is maintained at 5° C. for 100 hours. The mixture is then evaporated under reduced pressure, and the aqueous residue is saturated with sodium chloride and extracted with ethyl acetate. The extract is dried and evaporated to give a residue which is chromatographed on 50 g. of acid-washed silica gel (Silicar CC4), eluting successively with 250 ml. of 50% ethyl acetate in Skellysolve B, 250 ml. 75% ethyl acetate in Skellysolve B, 750 ml. of ethyl acetate, and 500 ml. of ethyl acetate containing 5% methanol, collecting 50-ml. fractions after the solvent front reaches the bottom of the column. Fractions 16 and 28 are combined and evaporated to give 0.289 g. of $PGF_{2\alpha}$. Fraction 29 is evaporated to give 0.013 g. of $PGF_{2\alpha}$ containing a trace of $PGF_{2\beta}$. Fractions 30 to 34 are combined and evaporated to give 0.059 g. $PGF_{2\beta}$ containing about 15% $PGF_{2\alpha}$.

EXAMPLE 4

$PGF_{2\alpha}$

Hexamethyldisilazane (40 ml.) and then trimethylchlorosilane (10 ml.) are added with stirring at 25° C. to a solution of $PGE_2$ (10.0 g.) in 200 ml. of anhydrous tetrahydrofuran. The mixture is then protected from moisture and stirred slowly at 25° C. for 16 hours. The resulting mixture is then evaporated to a syrup under reduced pressure at 50° C. The syrup is then twice diluted with several volumes of benzene, the solution each time being evaporated under reduced pressure at 50° C. The resulting residue is then dissolved in 1600 ml. of methanol precooled to 5° C. The solution is cooled to −10° C., and a solution of sodium borohydride (28 g.) in 1600 ml. of methanol precooled to −10° C. is added rapidly with vigorous stirring and cooling so that the reaction mixture temperature remains below 5° C. A nitrogen atmosphere is maintained in the reaction vessel. The resulting mixture is stirred an additional ten minutes. Then, 30 ml. of acetone is added, and the mixture is stirred an additional 10 minutes. Then, 42 ml. of acetic acid is added, and the neutral solution is concentrated under reduced pressure at 50° C. to a 700-ml. volume. Water (130 ml.) is then added, and the mixture is allowed to stand at 25° C. for 4 hours. This mixture is concentrated under reduced pressure to remove methanol. The resulting residue is acidified to pH 2.5 with 2 N hydrochloric acid, and then is extracted four times with ethyl acetate. The combined extracts are washed twice with saturated aqueous sodium chloride solution, dried with anhydrous magnesium sulfate, and evaporated under reduced pressure. The residue is dissolved in a small amount of dichloromethane, and the solution is chromatographed on 700 g. of acid-washed silica gel (Silicar CC4) wet packed with 50% ethyl acetate in Skellysolve B, eluting successively with 3500 ml. 50% ethyl acetate in Skellysolve B, 7000 ml. 75% ethyl acetate in Skellysolve B, 3500 ml. ethyl acetate, and 3500 ml. 5% methanol in Skellysolve B, collecting 700-ml. fractions. Fractions 8 to 15 are combined and evaporated to give 6.66 g. of $PGF_{2\alpha}$. Fractions 21 to 25 are combined and evaporated to give a crystalline residue which is recrystallized to give 1.37 g. of $PGF_{2\beta}$. The mother liquor from this recrystallization is evaporated, and the residue is combined with the resdue obtained by evaporation of eluate fractions 16 to 20. These combined residues are chromatographed in the same manner, using proportionately smaller amounts of silica gel and solvents to give an additional 1.24 g. of $PGF_{2\alpha}$.

Following the procedures of Examples 3 and 4 but using dihydro-$PGE_1$ acid, $PGE_1$ acid, and $PGE_3$ acid in place of the $PGE_2$ acid, there are obtained PGF mixtures containing major proportions of dihydro-$PGF_{1\alpha}$, $PGF_{1\alpha}$, and $PGF_{3\alpha}$, respectively, from which mixtures those PGF's are each separated as described in Examples 3 and 4.

Also following the procedures of Examples 3 and 4 racemic dihydro-$PGE_1$, racemic $PGE_1$, racemic $PGE_2$, and racemic $PGE_3$ in place of the $PGE_2$, there are obtained racemic PGF mixtures containing major proportions of racemic dihydro-$PGF_{1\alpha}$, racemic $PGF_{1\alpha}$, racemic $PGF_{2\alpha}$, and racemic $PGF_{3\alpha}$, respectively. Those compounds are each separated from the reduction product mixture as described in Examples 3 and 4.

Also following the procedures of Examples 3 and 4 but preparing triphenylsilyl ether-esters and tribenzylsilyl ether-esters of dihydro-$PGE_1$, racemic dihydro-$PGE_1$, $PGE_1$, racemic $PGE_1$, $PGE_2$, racemic $PGE_2$, $PGE_3$, and racemic $PGE_3$, there are obtained PGF mixtures containing major proportions of the corresponding $PGF_\alpha$ and each of which is separated from the reduction product mixture as described in Examples 3 and 4.

Also following the procedures of Examples 3 and 4 but using potassium borohydride, zinc borohydride, lithium (tri-tert-butoxy) aluminum hydride, sodium trimethoxyborohydride, lithium borohydride, and diisobutyl aluminum hydride, each in place of the sodium borohydride of the examples, there are obtained $PGF_2$ mixtures containing major proportions of $PGF_{2\alpha}$ which is separated from the reduction product mixtures as described in Examples 3 and 4.

We claim:
1. A composition of matter comprising a mixture of the alpha and beta isomers of an optically active compound of the formula:

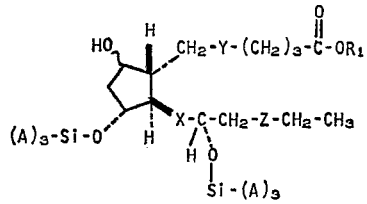

or a racemic compound of that formula and the mirror image thereof, wherein X is —$CH_2$—$CH_2$— or trans-CH=CH—, and both Y and Z are —$CH_2CH_2$—, or wherein X is trans-CH=CH—, Y is cis-CH=CH—, and Z is —$CH_2CH_2$ or cis-CH=CH—, where A is alkyl of one to 4 carbon atoms, inclusive, phenyl, phenyl substituted with one or two alkyl of one to 4 carbon atoms, fluoro, or chloro, or aralkyl of 7 to 12 carbon atoms, inclusive, and wherein $R_1$ is hydrogen, alkyl of one to 4 carbon atoms, inclusive, or —Si(A)$_3$ wherein A is as defined above, and wherein ~ indicates attachments of HO— to the ring in alpha or beta configuration.

2. A mixture according to claim 1 wherein R$_1$ is hydrogen and A is methyl.

3. A mixture according to claim 1 wherein R$_1$ and A are methyl.

4. An optically active mixture according to claim 2 wherein X is trans-CH=SH—, and Y and Z are

—CH$_2$CH$_2$—

5. A racemic mixture according to claim 2 wherein X is trans-CH=CH— and Y are Z are —CH$_2$CH$_2$—.

6. An optically active mixture according to claim 3 wherein X is trans-CH=CH—, and Y and Z are

—CH$_2$CH$_2$—

7. A racemic mixture according to claim 3 wherein X is trans-CH=CH— and Y and Z are —CH$_2$CH$_2$—.

8. An optically active mixture according to claim 2 wherein X is trans-CH=CH—, Y is cis-CH=CH—, and Z is —CH$_2$CH$_2$—.

9. A racemic mixture according to claim 2 wherein X is trans-CH=CH—, Y is cis-CH=CH—, and Z is —CH$_2$CH$_2$—.

10. An optically active mixture according to claim 3 wherein X is trans-CH=CH—, Y is cis-CH=CH—, and Z is —CH$_2$CH$_2$—.

11. A racemic mixture according to claim 3 wherein X is trans-CH=CH—, Y is cis-CH=CH—, and Z is

—CH$_2$CH$_2$—

12. A compound of the formula:

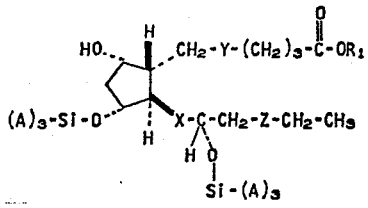

wherein
X is —CH$_2$CH$_2$— or trans-CH=CH—, and both Y and Z are —CH$_2$CH$_2$—, or wherein X is trans-CH=CH—, Y is cis-CH=CH—,
and Z is —CH$_2$CH$_2$— or cis-CH=CH—, wherein A is alkyl of one to 4 carbon atoms, inclusive, phenyl, phenyl substituted with one or two alkyl of one to 4 carbon atoms, fluoro, or chloro, or aralkyl of 7 to 12 carbon atoms, inclusive, and wherein R$_1$ is hydrogen, alkyl of one to 4 carbon atoms, inclusive, or —Si(A)$_3$ wherein A is as defined above.

13. A compound according to claim 12 wherein R$_1$ is hydrogen and A is methyl.

14. A compound according to claim 12 wherein R$_1$ and A are methyl.

15. An optically active compound according to claim 13 wherein X is trans-CH=CH—, and Y and Z are

—CH$_2$CH$_2$—

16. A racemic compound according to claim 13 wherein X is trans-CH=CH—, and Y and Z are —CH$_2$CH$_2$—.

17. An optically active compound according to claim 14 wherein X is trans-CH=CH—, and Y and Z are

—CH$_2$CH$_2$—

18. A racemic compound according to claim 14 wherein X is trans-CH=CH—, adn Y and Z are —CH$_2$CH$_2$—.

19. An optically active compound according to claim 13 wherein X is trans-CH=CH—, Y is cis-CH=CH—, and Z is —CH$_2$CH$_2$—.

20. A racemic compound according to claim 13 wherein X is trans-CH=CH—, Y is cis-CH=CH—, and Z is —CH$_2$CH$_2$—.

21. An optically active compound according to claim 14 wherein X is trans-CH=CH—, Y is cis-CH=CH—, and Z is —CH$_2$CH$_2$—.

22. A racemic compound according to claim 14 wherein X is trans-CH=CH—, Y is cis-CH=CH—, and Z is —CH$_2$CH$_2$—.

No references cited.

TOBIAS E. LEVOW, Primary Examiner

P. F. SHAVER, Assistant Examiner

U.S. Cl. X.R.

260—468 R